United States Patent [19]
Paynter, III

[11] Patent Number: 4,947,270
[45] Date of Patent: Aug. 7, 1990

[54] VIDEO CASSETTE REWIND APPARATUS

[76] Inventor: Lewis Paynter, III, Wellington, St. George, Bermuda, 6E02

[21] Appl. No.: 166,399

[22] Filed: Mar. 10, 1988

[51] Int. Cl.$^5$ ............................................. G11B 5/008
[52] U.S. Cl. ................................... 360/14.1; 360/137; 358/335; 369/72; 15/DIG. 13; 242/197
[58] Field of Search ................ 360/14.1, 57, 66, 137; 358/311, 335; 369/72; 15/97 R, 100, 256.5, 256.51, DIG. 13; 242/54.1, 179, 194, 197

[56] References Cited
U.S. PATENT DOCUMENTS

| | | | |
|---|---|---|---|
| D. 188,474 | 7/1960 | Spadaro . | |
| D. 190,029 | 4/1961 | Butler . | |
| D. 270,833 | 10/1983 | Spicer . | |
| D. 274,426 | 6/1984 | Thiele . | |
| 3,535,468 | 10/1970 | Kinjo | 360/57 |
| 4,054,344 | 10/1977 | Fujimoto et al. . | |
| 4,107,810 | 8/1978 | Varni et al. | 369/72 X |
| 4,257,079 | 3/1981 | Yoshizawa | 15/100 X |
| 4,324,014 | 4/1982 | Stutz, Jr. et al. | 15/97 R |
| 4,503,475 | 3/1985 | Hall | 15/DIG. 13 X |
| 4,566,653 | 1/1986 | Bettinger . | |
| 4,637,088 | 1/1987 | Badaracco et al. | 75/97 R |
| 4,639,967 | 2/1987 | Bordignon | 369/72 X |
| 4,823,198 | 4/1989 | Okumura | 358/311 |

OTHER PUBLICATIONS

Toshiba Owner's Manual, VCR V-S36, 1983, pp. 2, 9-18, 37-38.
AUdio, Jul. 1959, p. 56.

Primary Examiner—Steven L. Stephan
Assistant Examiner—W. R. Young
Attorney, Agent, or Firm—Leon Gilden

[57] ABSTRACT

A video cassette rewind apparatus is set forth for the rewinding of conventional video cassettes wherein the apparatus includes a counter for the selective editing and positioning of tape therein and for use in conjuction with a selectively operative electro-magnet positioned adjacent the path of the tape to be rewound to selectively erase portions of tape. Further included in the apparatus is a tape cleaning head associated with a reservoir for the cleaning of the tape.

1 Claim, 3 Drawing Sheets

VIDEO CASSETTE REWIND APPARATUS

BACKGROUND OF THE INVENTION

1. Field of the Invention

The invention relates to tape handling apparatus and particularly pertains to a new and improved video cassette rewind apparatus that enables the selective cleaning and erasing of tape utilized by conventional video cassette recorder devices.

2. Description of the Prior Art

The use of tape rewinding and processing apparatus including the editing and cleaning of various tape is known in the prior art, but normally these various events must be dealt with individually substantially increasing the time and attention required to perform the various operations. Furthermore, when moving tape from one device to another and due to the idiosyncrasies of each device, positioning of a tape is somewhat changed from one device to the next thereby resulting in varying points of stoppage and start along a tape with the attendant results of not uniformly processing such tape. For example, U.S. Pat. No. 3,021,989 to Sellers sets forth a driving capstan arrangement for driving a quantity of tape within the device. The patent is primarily concerned with the mechanical relationship of the capstan to a driving mechanism for proper handling of tape within the device. The Sellers patent is set forth merely to illustrate that the prior art has well provided for the teaching of driving tape past a processing station, such as a recording head, where the instant invention has refined the processing of a particular, namely the use of video cassette tape.

U.S. Pat. No. 4,054,344 to Fujimoto, et al., is an example of a storage receptacle for magnetic tape, where U.S. Pat. No. 4,566,653 to Bettinger, et al., sets forth a modified tape cassette structure wherein the two patents are illustrative of various tape housing devices.

Similarly, U.S. Design Pat. No. 270,833 to Spicer, U.S. Design Pat. No. 265,524 to Basili, et al., and U.S. Design Pat. No. 188,474 to Spadaro set forth examples of various tape securement and housing devices.

The prior art has failed, however, to provide a modular construction for processing video cassette tape, as set forth by the instant invention, wherein the same provides means for both the editing and cleaning of such tape and thusly preparing such tape for subsequent use and in this respect, the present invention substantially fulfills this need.

SUMMARY OF THE INVENTION

In view of the foregoing disadvantages inherent in the known types of tape rewind apparatus now present in the prior art, the present invention provides an video tape cassette rewind apparatus wherein the same enables rewinding or advancing of video cassette tape proximate a processing means wherein said processing means includes a selectively operative tape erasure portion and a cleaning head for imparting a cleaning solution onto the passing tape. As such, the general purpose of the present invention, which will be described subsequently in greater detail, is to provide a new and improved video tape cassette rewind apparatus which has all the advantages of the prior art tape rewind apparatus and none of the disadvantages.

To attain this, the present invention comprises a video tape cassette rewind apparatus for rewinding and processing video tape formed as an enclosure with an access opening therein for accepting the video tape cassette and provided with drive means to advance the tape proximate a processing means that includes an editing portion formed as an electro-magnetic device for selectively erasing portions of a tape and a cleaning apparatus to impart a cleaning solution onto the passing tape surface.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved video cassette rewind apparatus which has all the advantages of the prior art video cassette tape rewind apparatus and none of the disadvantages.

It is another object of the present invention to provide a new and improved video cassette tape rewind apparatus which may be easily and efficiently manufactured and marketed.

It is a further object of the present invention to provide a new and improved video cassette tape rewind apparatus which is of a durable and reliable construction.

An even further object of the present invention is to provide a new and improved video cassette tape rewind apparatus which is susceptible of a low cost of manufacture with regard to both materials and labor, and which accordingly is then susceptible of low prices of sale to the consuming public, thereby making such video cassette tape rewind apparatus economically available to the buying public.

Still yet another object of the present invention is to provide a new and improved video cassette tape rewind apparatus which provides in the apparatuses and methods of the prior art some of the advantages thereof, while simultaneously overcoming some of the disadvantages normally associated therewith.

Still another object of the present invention is to provide a new and improved video cassette tape rewind apparatus to selectively edit and clean video tape passing therealong.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
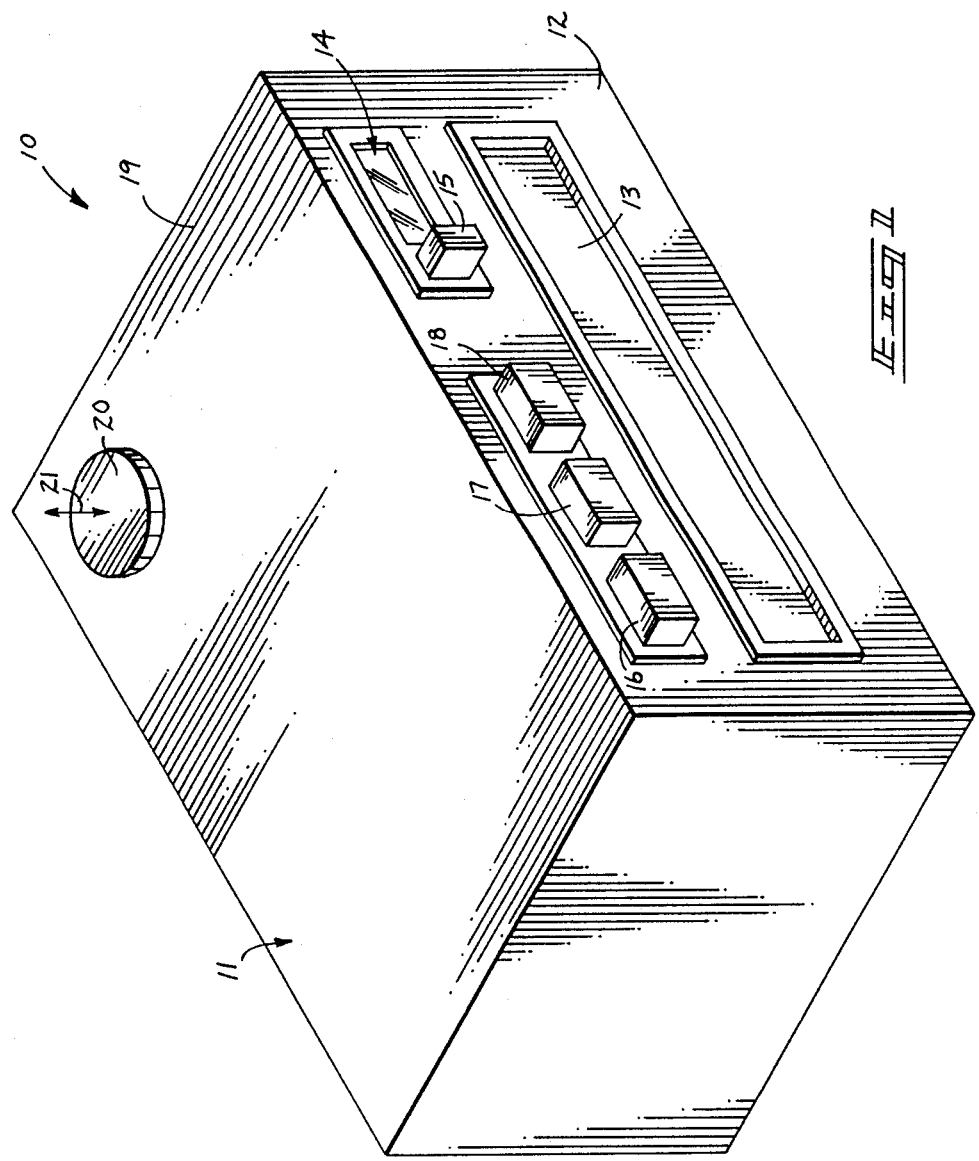
FIG. 1 is an isometric illustration of the instant invention.

With reference now to the drawings, and in particular to FIGS. 1 to 5 thereof, a new and improved video tape cassette rewind apparatus embodying the principles and concepts of the present invention and generally designated by the reference numeral 10 will be described.

More specifically, it will be noted that the video cassette rewind apparatus 10 essentially comprises a cabinet enclosure 11 including a forward face 12 positioned therethrough a plurality of the controls and access to the operation of the instant invention.

Forward face 12 has formed therethrough an access opening slot 13 through which a video tape cassette may be inserted. Insertion and the rotative driving of the tape within the video cassette is of conventional manufacture, as is well known in the industry, and is operatively associated with a counter mechanism 14 provided with a reset button 15 to enable the counting of the video tape as it is advanced past processing means provided within the video cassette rewind apparatus 10.

Positioned on forward face 12 are the necessary array of switches, such as the use of an on/off-eject switch 16 which may be in the form of a three-way switch or optionally an eject switch may be provided as an additional switch to enable and effect ejection of a video tape cassette inserted within apparatus 10.

There is provided an on/off electro-magnetic switch 17 for the selective operation of an electro-magnet positioned proximate the tape path the apparatus 10 to be described below. Also a forward and reverse switch 18 is positioned through forward face 12 and is generally in a configuration of a two-way switch of conventional manufacture whose detail and operation is well known in the industry and which further description is not therefore deemed necessary. Positioned on a top face 19 removably secured to an underlying reservoir, to be described below, in the direction of arrow 21 to enable access into the underlying reservoir.

Figure 2:
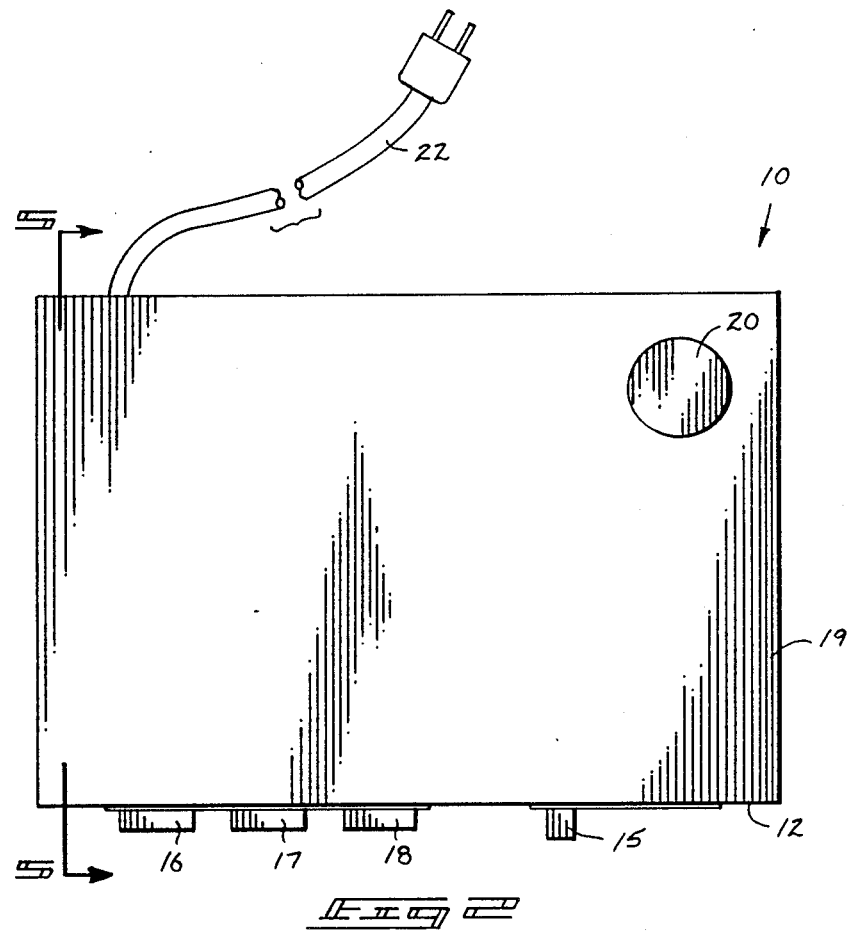
FIG. 2 is an orthographic top view of the instant invention.
Figure 3:
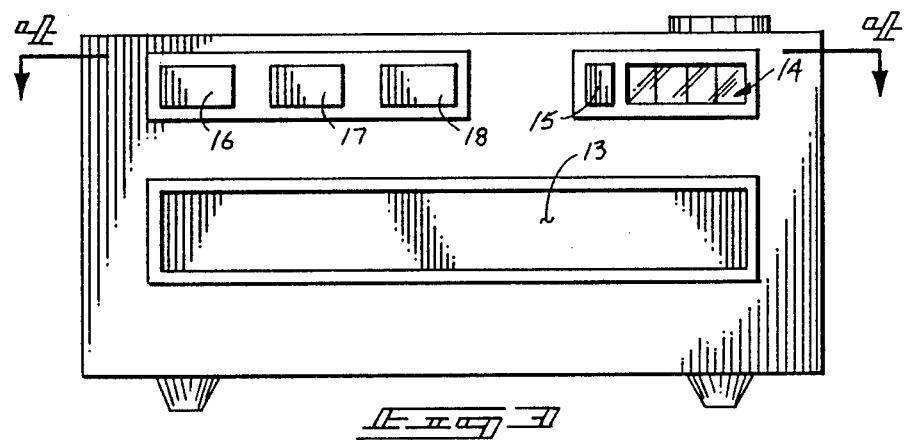
FIG. 3 is an orthographic view taken in elevation of the instant invention.

FIGS. 2 and 3 are illustrative of the general configuration of the instant invention with a conventional power cord 22 associated with the invention to provide electrical power for the motivation of the various components therein.

Figure 4:
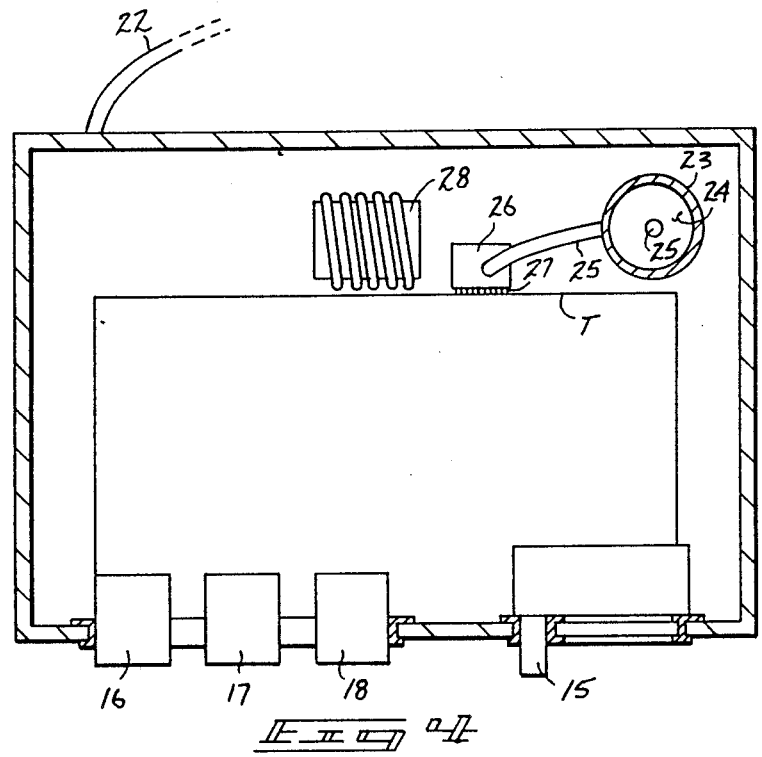
FIG. 4 is an orthographic top view taken along the lines 4—4 of FIG. 3.
Figure 5:
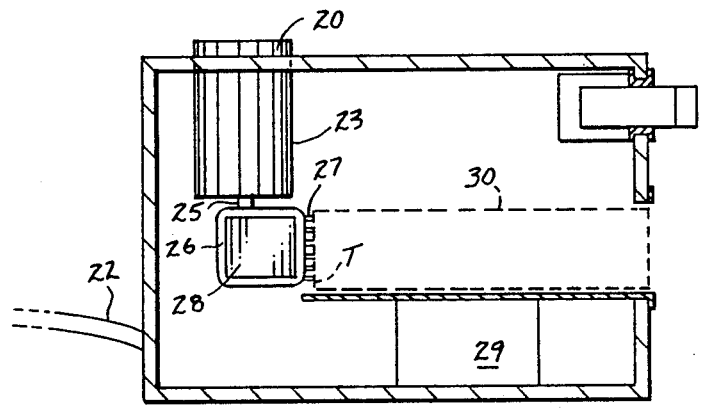
FIG. 5 is an orthographic view taken in elevation along the lines 5—5 of FIG. 2 in the direction indicated by the arrows.

Reference to FIG. 4 illustrates the essence of the instant invention wherein the aforenoted reservoir is illustrated as a reservoir 23 underlying the cap 20 formed with an interior cavity 24 for the storage of video tape cleaning fluid therein and provided with a conduit 25 to direct tape cleaning fluid to a cleaner head 26 that directs such fluid through applicator brush 27 to the surface of a tape "T" within a video cassette 30 positioned within the apparatus 10. Oriented also along the path of the tape "T" is an electro-magnet 28 selectively operative by means of switch 17 to enable selective erasure of portions of tape "T" that an individual user may wish to edit during the course of rewinding or advancing film within the video cassette 30. This feature enables rewinding or advancing of film without recourse to a conventional video cassette recorder and thereby enables erasure of various portions of the film without need to insert the video cassette 30 within a recorder apparatus and enables such erasure without recourse of the complexity of taping over a previously taped portion and merely providing a blank portion of tape upon activation of electro-magnet 28. Conventionally, a drive means 29 is oriented underlying support for the video cassette 30 within the video cassette rewind apparatus 10 whose construction and detail is of conventional organization well known in the prior art.

The instant invention therefore provides a synergistic combination of various components that enables convenient processing of video cassette tape in a simplified and convenient modular organization.

As to the manner of usage and operation of the instant invention, the same should be apparent from the above description and accordingly no further discussion relative to the manner of usage and operation of the invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A video tape cassette rewind apparatus for rewinding and processing video tape comprising,
    a cabinet enclosure formed with an access opening and support means for accepting said video tape cassette, drive means underlying said support means for advancing or rewinding said video tape along a path within said video tape cassette, processing means including selectively operative editing means for editing portions of said video tape, counter means operatively associated with said drive means to provide visual accounting of video tape length advanced passed said processing means, said process means further includes a cleaner head means with an applicator brush secured thereto for providing application of a video tape cleaning solution onto a surface of a video tape as it is progressed past said applicator brush, said cleaner head means further includes a conduit operatively associated with a reservoir for accepting a quantity of video tape cleaning solution therein, said reservoir is accessed through a removable cap wherein said reservoir is directed through an upper top face of said video cassette rewind apparatus to said cap overlying said reservoir above the surface of said top face for providing convenient access to said reservoir, said editing means comprises an electro-magnet positioned adjacent said tape path selectively operative by an on/off switch for selectively erasing predetermined portions of said video tape, and said apparatus further includes switching means for energizing or de-energizing said apparatus to enable advancing or rewinding of tape within said video tape cassette.

* * * * *